United States Patent
Felmus et al.

(10) Patent No.: US 6,226,559 B1
(45) Date of Patent: May 1, 2001

(54) METHOD OF PROVIDING REAL TIME MACHINE CONTROL SYSTEM PARTICULARLY SUITED FOR A POSTAGE METER MAILING MACHINE

(75) Inventors: Benita J. Felmus, Westport; Christopher S. Riello, Hamden; Edilberto I. Salazar, Brookfield, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 718 days.

(21) Appl. No.: 08/572,347

(22) Filed: Dec. 14, 1995

(51) Int. Cl.$^7$ .................................................. G05B 11/32
(52) U.S. Cl. ................. 700/67; 700/9; 700/192; 700/213; 700/215; 700/218; 700/220; 700/224; 700/225; 700/226; 700/227; 700/228; 700/229; 700/230; 382/182
(58) Field of Search .................. 700/9, 67, 213, 700/215, 218, 220, 224–230, 192; 382/182

(56) References Cited

U.S. PATENT DOCUMENTS 4,959,600 * 9/1990 DiGiulio et al. ................ 318/625
5,367,236 * 11/1994 Salazar ............................ 318/567
5,374,883 12/1994 Morser ............................ 318/605
5,390,351 2/1995 DiGiulio et al. ................ 709/225
5,552,991 * 9/1996 Lee et al. ..................... 364/464.02

FOREIGN PATENT DOCUMENTS

0177057 * 10/1985 (EP) .
0615213A2 * 11/1989 (EP) .

* cited by examiner

Primary Examiner—William A. Cuchlinski, Jr.
Assistant Examiner—McDievnel Marc
(74) Attorney, Agent, or Firm—Angelo N. Chaclas; Michael E. Melton

(57) ABSTRACT

The mailing machine includes a microcontroller system for executing machine control algorithms during each control cycle and user interface algorithms. Each control cycle is divided into first discrete time intervals sufficient to allow completion of the respective control algorithms, and a second time interval for execution of user interface algorithm and, if required, completion of the user interface algorithm during subsequent control cycles.

5 Claims, 4 Drawing Sheets

METHOD OF PROVIDING REAL TIME MACHINE CONTROL SYSTEM PARTICULARLY SUITED FOR A POSTAGE METER MAILING MACHINE

BACKGROUND OF THE INVENTION

The present invention relates to real time machine control systems and, more particularly, to such control systems particularly suited for the control of a postage meter mailing machine.

A known mail processing control system is illustrated in U.S. Pat. No. 4,959,600, entitled "Microprocessor System Controller For Mail Processing System Applications" and U.S. Pat. No. 5,331,538, entitled "Mail Processing System Controller". The control system is principally partitioned into two independent systems. The first system is the host microcontroller system for controlling the man machine interface and external communication functions and a motor control system for controlling and coordinating the operation of a number of motors pursuant to sensor input. In order to accommodate the data process control needs of the system motors in real time, the motor control system is divided into control cycles. Each control cycle is set to run at a fixed period. Each period is further divided into a number of intervals which are assigned to perform data process functions for a particular subsystem. For example, each control cycle is set to be initiated every 2 millisecond. During each control cycle, nozzle command generation is allocated 45 microseconds, position servo control is allocated 40 microsecond, sensor input is allocated 30 microseconds, and so forth. At the end of each cycle a 500 microsecond timer interrupt routine is executed during which a system check is performed to assure that the system software is properly executing. The host microcontroller system performs in a conventional manner to control non-real time functions such as keyboard and display communication and external communication. A shared random access memory is used to allow access to necessary information between the two microcontroller systems. The described known mailing machine control system requires a number of microprocessors of sufficient speed to perform all the necessary data processing. Consequently the mailing machine control system represents a substantial cost.

SUMMARY OF THE INVENTION

It is an object of the present invention to present a mailing machine control system which provides both motor control and external system control utilizing a single microcontroller system.

It is a further objective of the present invention to present a mailing machine control system which can perform real time machine control and man machine interface (MMI) control functions within a single control cycle of the microcontroller system.

It is a still further objective of the present invention to present a system control architecture representing a low-cost solution for control of a mailing machine which is flexible enough to be reused for a variety of mailing machine options providing the benefit of software and hardware reusability.

It is a still further objective of the present invention to present a low-cost software control system and software architecture that enables a high performance real-time machine control system that has a discrete time-slice architecture, with fully featured user interface software to drive a low-cost machine application.

A postage meter system in accordance with the present invention includes a mailing machine, which serves as a platform for the meter unit and printing unit. The mailing machine includes a microcontroller system which is responsible for controlling a number of system operations. Preferably, the mailing machine includes a feeder section for receiving a stack of envelopes and presenting a plurality of the envelopes to a singulation station. The singulation station is responsible for withdrawing a single envelope in a seriatim manner from the envelopes presented. An envelope is then transported to an integrated scale where the envelope may be weighed. The envelope is then presented to the printing station. The printing unit then prints a postage indicia and any other additional information, such as, an ad slogan, delivery address or bar code, on the envelope. In a preferred configuration, it is contemplated that printing will occur during relative motion between the envelope and a digital printing unit, such as an ink jet printer. Therefore, the microcontroller system of the mailing machine will be responsible for relatively precise control of the motors responsible for transporting the envelope. It should be appreciated that it is an objective of the mailing machine control system to promote maximum machine through-put.

The mailing machine also contains the man machine interface system which enables interfacing a keyboard and display, non-secure accounting system, communication to external printing devices, modem communication for data center communication and other subsystem functions.

Metering is provided by two independent units which are a meter vault and a printer. The vault accounts for dispensed funds used during posting of each envelope. Communication between the mailing machine, vault and printer is facilitated through a printer interface unit. The printer interface serves as a junction board for the mailing machine, meter vault, graphics interface, if present, and print head. The printer interface provides the connections for a serial communication linkage and unregulated DC power from the mailing machine to the meter vault, transfers print command and status signals between the mailing machine and print head, interfaces the graphics interface to the print head, supports a unique serial link between the meter vault and print head, and regulates logic and print nozzle power from the mailing machine to the print head.

The mailing machine microcontroller system is required to provide machine control as well as interface control. Within the system, machine control and user interface control are combined in a discrete time-slice architecture to achieve the desired functionality. Machine control portions of the system are driven by a discrete timer which causes the control algorithms to execute within a specified time interval. When the discrete time interval occurs, the machine control algorithms execute to completion. These algorithms complete prior to the occurrence of the next discrete time interval. During the time between the completion of the motion control algorithms and the occurrence of the next discrete time event (MMI interval), the software algorithms for controlling the user interface and other subsystem functions are allowed to execute, if required. The algorithms to be executed during MMI interval are not required to be completed during the MMI interval. Completion of the MMI algorithms can await the next MMI interval of the subsequent control cycle. If there are no MMI algorithms presented, then the microcontroller system queues the microcontroller system defaults during that MMI interval to perform a timer interrupt routine to check system operation.

DETAILED DESCRIPTION OF THE PREFERRED EMBODIMENT

Figure 1:
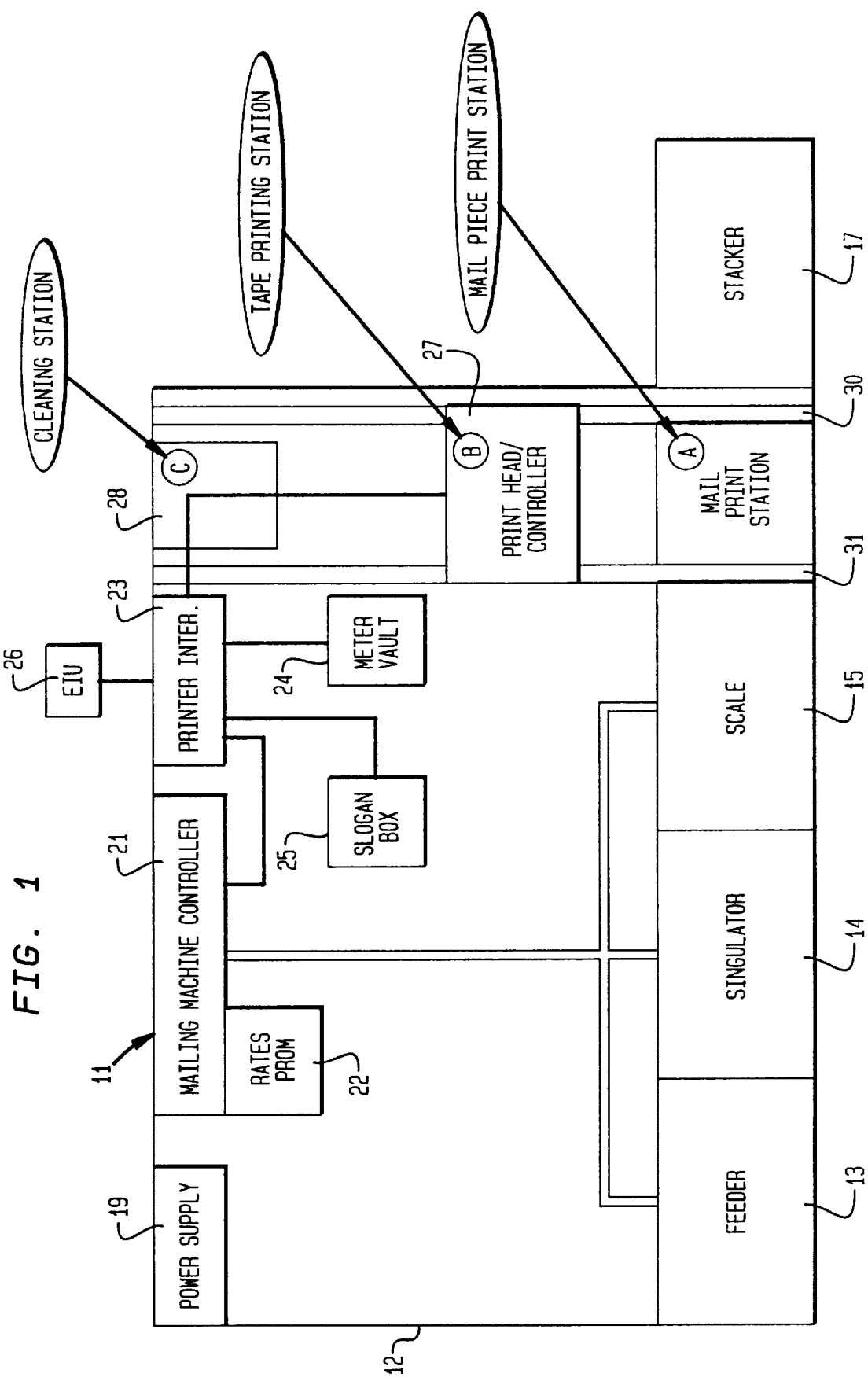
FIG. 1 is schematic of a mail processing system in accordance with the present invention.

Referring to FIG. 1, the postage meter system, generally indicated as 11, includes a mailing machine base 12. The mailing machine base 12 is of any suitable known design and, in the preferred embodiment, includes a feeder 13, singulator 14 and scale 15 positioned serially along a mail flow path. Following the scale 15 is a print station at location A which is followed by a stacker 17. Any suitably designed feeder 13, singulator 14, scale 15 and stacker 17 may be used. The operation of the respective feeder 13, singulator, printer transport and envelope transport (not shown) is under the control of a mailing machine controller 21. Power is provided by a conventional power supply 19. It should be appreciated that the mailing machine microcontroller 21 is responsible for providing real time motor control function to motors 81 and 83 (refer to FIG. 3), in addition to, non-real time control of man machine interface functions as keyboard and display, unsecured departmental accounting (not shown) and external communications. As depicted in FIG. 1, a rates memory (PROM 22) is detachably mounted to the mailing machine controller 21 to provide rate information to the mailing machine controller 21 in any suitable conventional manner.

Also, housed in the mailing machine is a printer interface 23, graphics interface 25, meter vault 24 and print head/controller 27, hereafter referred to as print head 27. The print head 27 is mounted to a pair of rails 30 and 31 by any suitable means to be positionable, by any conventional means (not shown) in response to a motor 81 or 83 between a first position "A" which is the print position, a second position "B" which is a tape print position, and a third position "C" which is a cleaning position. At position "C" the print head 27 is brought into contact with a nozzle cleaning system of any suitable design for cleaning. The positioning of the print head 27 along the rails 30 and 31 is under the control of the mailing machine controller utilizing any suitable conventional control means.

Also, the mailing machine base 12 includes provisions for allowing the external interface of an external interface unit (EIU 26) to the printer interface 23 by any conventional means. The EIU 26 provides additional microprocessor functionality to the system 11 utilizing any suitable method.

Figure 2:
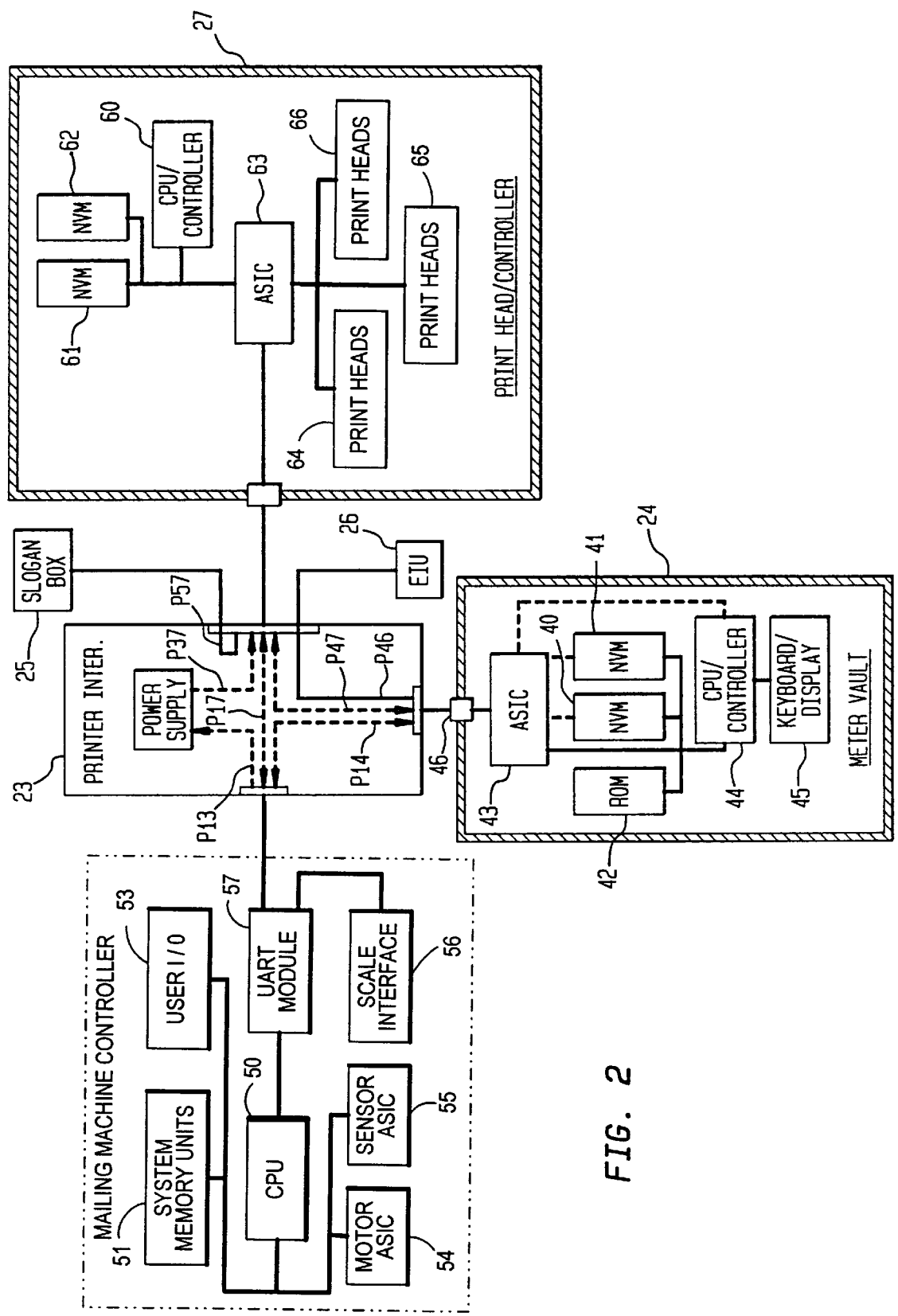
FIG. 2 is a schematic of the microcontroller system for a mailing machine in accordance with the present invention in combination with a meter vault, printer interface and printer particularly suited to the present invention.

Referring to FIG. 2, the meter vault 24 includes a source accounting memory 40 and 41, program memory 42, application specific integrated circuit (ASIC) 13, CPU controller 44, and keyboard/display 45. The keyboard/display 45 is proved to the meter vault 24 to facilitate manual meter recharging.

The communication port 46 is modified to include an extra pin for receiving DC power from the mailing machine. It should be appreciated that the keyboard and display 45 is provided an operator or postal agent a means of recharging the accounting registers of the accounting memory 40 and 41 through the keyboard in any suitable conventional manner.

The mailing machine controller 21, among other things which will be described in more detail subsequently, includes a controller CPU 50, system memory units, generally indicated as 51, user input/output 53, motor control ASIC 54, sensor control ASIC 55. Also, provided is a scale interface 56 and UART interface 57. The UART interface 57 is of any suitable design for allowing asynchronies serial communication. Of principle concern to the preferred embodiment of the present invention is that the UART interface facilitates communication between the mailing machine controller 21 and the other system units 23, 24, 25, 26 and 27.

The printer interface 23 serves as a junction board for the mailing machine 21, meter vault 24, print head 27 and a graphics interface 25. By providing specific communication paths P13, P14, P17, P37, P46, P47, P57 within the printer interface 23, the individual subsystems can be isolated in such a manner to remove the necessity for interdependent security measures. Meter vault 24 communications to the print head 27 are routed through the printer interface 23 along communication path P47. Communications path 47 is also used to select inscriptions and slogans in conjunction with the graphics interface 25. A printer interface path P46 is provided for electrical communication with the EIU 26. As aforenoted, the EIU 26 represents an external unit which can be attached to the meter vault 24 to provide enhanced capability to the meter vault 24 when the meter vault 13 is used in combination with a reduced featured mailing machine.

The graphics interface 25 stores graphic images representing the fixed part of the standard indicia (e.g., the eagle printed on US mail), low-value indicia, permit mail indicia, town circle (where appropriate), inscriptions, and slogans. It also stores the fonts for printing the variable data on the mail piece.

The print head 27 is comprised of a CPU controller 60, nonvolatile memory units 61 and 62, ASIC 63 and ink jet print heads 64, 65, 66. The print head 27 prints the indicia including postage amount, digital tokens, piece count, and date as well as an optional inscription and slogan on each mail piece. The fixed part of the image, fonts for the variable parts of the image, and inscription bit-maps are programmed into the print head's NVM 61 and 62 when the print head is first installed in the mailing machine 17. The meter vault 24 will send a message to the print head indicating the format of the town circle. The print head 27 obtains the town circle information as either a text string from the meter vault or a bit map from the graphics interface and programs its NVM with the data. For each mail piece, the meter vault 24 transfers the variable indicia information such as the postage amount, digital tokens, meter serial number, and piece count to the print head 27. The print head controller 60 programs registers (not shown) in the ASIC 63 with this information. When the mailing machine controller 21 commands the print head to print, the ASIC 63 combines the fixed and variable parts of the image for printing by the print units 64, 65 and 66 utilizing any suitable technique.

Figure 3:
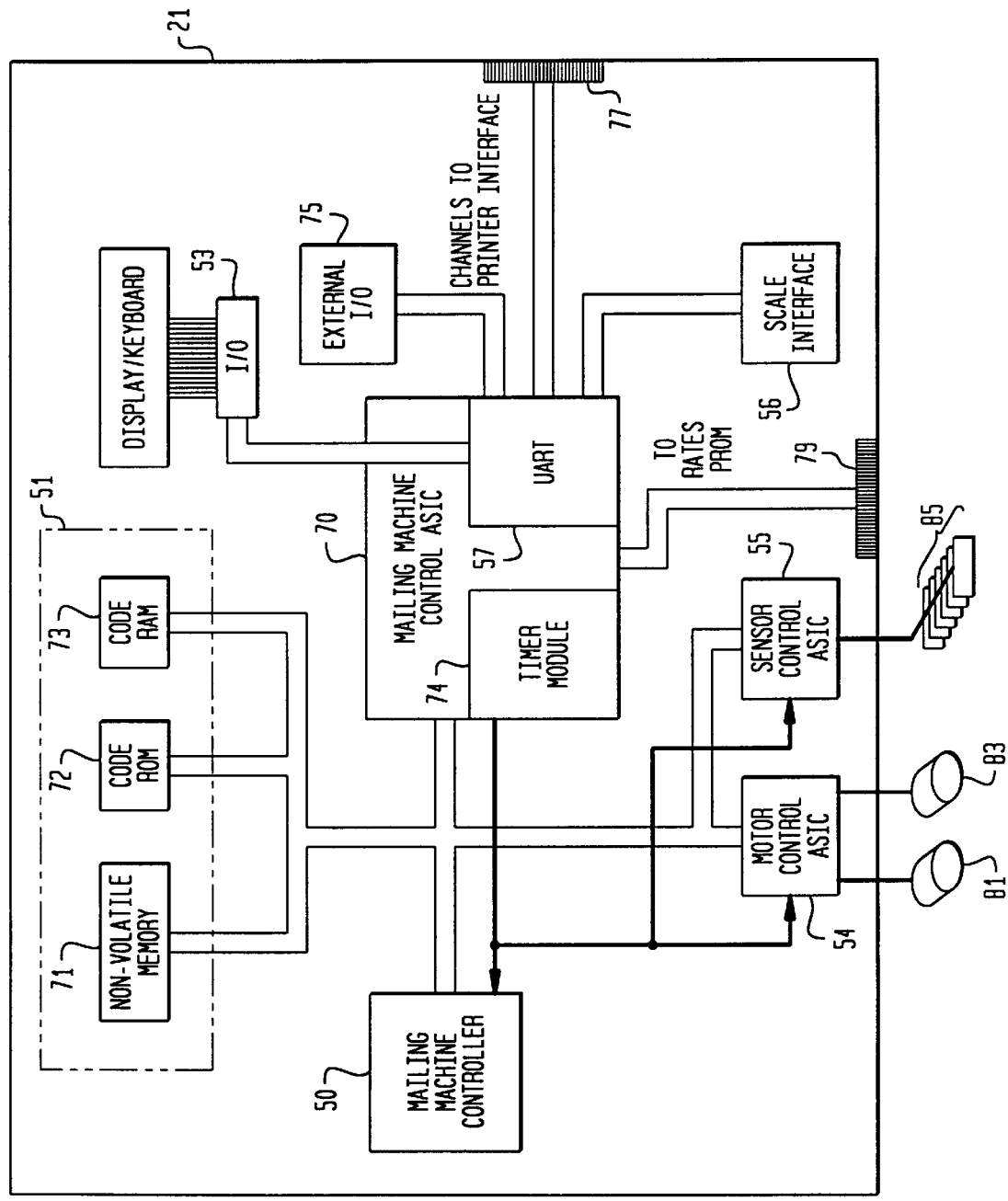
FIG. 3 is an expanded schematic of the mailing machine microcontroller system in accordance with the present invention.

Referring now more particularly to FIG. 3, the mailing machine controller 21 utilizes a controller 50 in bus communication with a control ASIC 70, the motor control ASIC 54, the sensor control ASIC 55 and memory units 71 to 73. The control ASIC 70 includes a UART module 57 (Universal A-Synchronous Receive And Transmits) to enable serial communication and a timer module 74. The UART module 57 is in direct communication with the scale interface 56 and, in addition, an external I/O 75 and a two channel printer interface connector 77 provided to facilitate communications with the printer interface 23 as described above. Also, provided is a connector 79 which is provided to allow connection of a rates prom 22 to the control ASIC 70.

In the preferred embodiment, the mailing machine base 12 includes two motors 81 and 83 which are provided as prime movers for the various mailing machine stations. These motors 81 and 83 are in electrically responsive communication with the motor ASIC 54. The motor ASIC 54 provides independent control of the drive output of the motors 81 and 82. Also provided are a plurality of sensors 85 which are positioned at various points along the mail path. The sensor is directed to the sensor ASIC 55 which provided processed information to the microcontroller 50 for use by the motor control algorithms in a conventional manner. The control ASIC 70 includes a timer module 47 which provides timing signals to the controller 50, motor control ASIC 54 and sensor ASIC 55.

Figure 4:
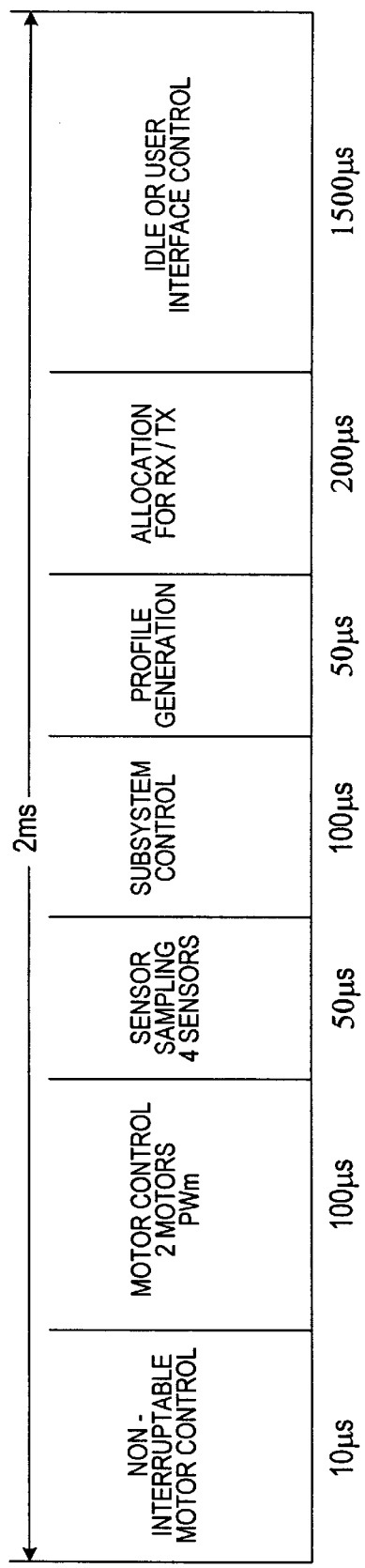
FIG. 4 is a time diagram of the mailing machine microcontroller system in accordance with the present invention.

Referring to FIG. 4, each process control cycle is set at a discrete time of 2 ms in the preferred embodiment. Each control cycle allocates a discrete time interval for motion control (motor control, sensor sampling, subsystem control and profile generation), communications (RX/TX) through the UART Module and idle. During idle time, the microprocessor 50 can then process user interface control algorithms. The system algorithm for motor control, sensor sampling and processing, subsystem control, motor control profile generation and communication are provided sufficient time to complete. The algorithms that execute during idle time control the mailing machine user interface, message processing and perform machine synchronization and high-level control.

What is claimed is:

1. An improved method of controlling a mailing machine wherein said mailing machine includes a microcontroller system for executing machine control algorithms during each control cycle and having a user Interface system responsive to user interface algorithms, wherein said improved method comprises the steps of:

dividing said control cycle into first discrete time intervals sufficient to allow completion of said respective control algorithms and second discrete time intervals, and providing for partial execution of user interface algorithm during said second discrete time intervals and completion of said user interface algorithms during subsequent control cycles.

2. An improved method of controlling a mailing machine as claimed in claim 1 wherein said microcontroller system includes a microcontroller in bus communication with a control ASIC, a motor control ASIC for controlling one or more motor, and a sensor control ASIC for receiving signal data from one or more sensors, wherein said first discrete time intervals comprises a motor control PWM interval for completion of the execution of the PWM algorithm for motor control, a sensor sampling interval for execution of the sampling algorithm associated with said sensors, and a profile generation interval for executing motor performance profile generation for communication to said motor control ASIC.

3. An improved method of controlling a mailing machine as claimed in claim 2 wherein said first discrete time intervals further comprises a communication interval for transmitting and receiving communication data to and from said UART module.

4. An improved method of controlling a mailing machine as claim in claim 3 wherein said step of dividing said control cycle into first time intervals further comprises the steps of:

executing said motor PWM algorithms;

executing said sensor sampling algorithms;

executing said motor profile generation algorithms;

executing said UART algorithms;

proceeding to said second time interval.

5. An improved method of controlling a mailing machine as claimed in claim 4 further comprising said control ASIC having further subsystem modules and said first time intervals having a subsystem control interval for executing subsystem control algorithms.

* * * * *